United States Patent [19]

Tompkins

[11] Patent Number: 5,402,600
[45] Date of Patent: Apr. 4, 1995

[54] FOAM PLASTIC LINED TREE SUPPORT COLLAR

[76] Inventor: Keith P. Tompkins, 9 Vineyard Ct., Tivoli, N.Y. 12583

[21] Appl. No.: 269,763

[22] Filed: Jul. 1, 1994

[51] Int. Cl.⁶ .............................................. A01G 7/00
[52] U.S. Cl. .......................................... 47/42; 47/43
[58] Field of Search ............ 47/24, 24 T, 42 T, 42 R, 47/43 R, 44 L

[56] References Cited

U.S. PATENT DOCUMENTS

| | | | |
|---|---|---|---|
| 1,399,207 | 12/1921 | Goozey | 47/44 L |
| 2,030,052 | 2/1936 | Bernitz, Sr. | 47/24 |
| 3,526,056 | 9/1970 | Stropkay | 47/42 R |
| 3,963,855 | 6/1976 | Hawkins et al. | 47/43 R |
| 4,073,090 | 2/1978 | Lucia | 47/42 T |
| 4,480,403 | 11/1984 | Williams | 47/43 R |
| 5,048,229 | 9/1991 | Campbell | 47/24 |

FOREIGN PATENT DOCUMENTS

| | | | |
|---|---|---|---|
| 366305 | 10/1906 | France | 47/43 R |
| 191937 | 11/1907 | Germany | 47/43 R |
| 8403826 | 7/1986 | Netherlands | 47/44 L |
| 27468 | 2/1903 | Switzerland | 47/43 R |
| 17548 | of 1906 | United Kingdom | 47/43 R |
| 1748738 | 7/1992 | U.S.S.R. | 47/44 |

Primary Examiner—Ramon S. Britts
Assistant Examiner—Joanne C. Downs
Attorney, Agent, or Firm—Martin J. Spellman, Jr.

[57] ABSTRACT

A support collar for a growing tree or plant including two arcuate plastic halves integrally hinged on a first longitudinal side and snap lock elements on the second longitudinal sides. The collar halves have an inwardly projecting support shelf for holding a foam liner in place. The liner is cylindrical in shape with a longitudinal opening to allow placement around a tree trunk. Loops for fastening grip ropes to the collar halves are provided.

1 Claim, 2 Drawing Sheets 5,402,600

FOAM PLASTIC LINED TREE SUPPORT COLLAR

BACKGROUND OF THE INVENTION

1. Field of the Invention

The present invention is concerned with support devices for growing young trees which in the early period of their growth need support to maintain their upright position and be guided in their growth. Such devices should be relatively inexpensive, easy to install, harmless to the tender young bark of the tree, or otherwise impede the growth of the tree itself. It is important that such device is maintained its desired position relative to the height of the tree and be adaptable to increasing thickness of the trunk of the tree as it develops.

2. Prior Art

Investigation of prior art in this area relative to the subject matter of the present invention disclosed U.S. Pat. No. 4,480,403, Williams, a tree supporting apparatus mounted on a T-shaped post having an adjustable length beam extending laterally from the post. At the end of the beam, there is mounted a pair of collar portions that are bolted together. The collar portions are jointed with bolts passing through a pair of flanges on the edge of the collar portions. A sheet of resilient material is placed between the cylindrical collar and the stem of the tree.

U.S. Pat. No. 4,462,622, Ten Pas, discloses a collar having halves which are bolted together. Located below the main support collar there is a pliable material such as carpeting around which the straps are wrapped. The purpose of this arrangement is to provide an easy way for lifting up leg supports for trimming around the base of the tree without completely removing the support.

In U.S. Pat. No. 2,007,606 Jennick a tree brace has rubber pads to keep a large portion of the bracing material from direct contact with the branches being supported.

In a similar manner, in U.S. Pat. No. 3,526,056, Stropkay, an adjustable loop tie fastener is disclosed and supporting straps are looped through apertures in a soft pad adjustable for the particular tree six and in effect is still strapping the tree which is inconvenient.

In U.S. Pat. No. 3,505,761, Prieur, a tree support is made from a bearable plastic, a non-wettable material which cuts down on disease.

The following patents all deal with tree staking arrangements and are mentioned as part of general background information in this area.

U.S. Pat. No. 4,804,027 Skieriderski, is of interest for the utilization of buffers at the outer end of the support posts. the buffers are generally made of rubber.

U.S. Pat. No. 2,501,255, Bell, discloses a splint for a tree and it is usually made of wood.

U.S. Pat. No. 3,010,256, Ise, discloses a tree support utilizing an abrasion resisting shield over a clamp.

U.S. Pat. No. 4,073,090, Lucia, is of interest for using a tree collar which automatically comes apart after a certain amount of interior tension is placed on it as the tree grows.

U.S. Pat. No. 4,366,647, Daun, discloses a tree support collar which is simply an expandable coil placed around the tree and to which the support wires are fastened.

In U.S. Pat. No. 4,852,299, Smoak, et al., straps placed around the tree are designed of climatologically degradable material so that they disintegrate over a period of time.

SUMMARY OF THE INVENTION

The tree staking device includes two arcuate plastic halves hinged together on one side by an integral plastic hinge flap having a snap together latch on the opposite side. The interior faces of the plastic halves are lined with a foam plastic which is designed to be slipped into the inner sections and have a stock of varying thickness to adjust for the thickness of the tree. The outside surfaces of the plastic arcuate halves are provided with loops for attaching the traditional guy wires or ropes. The lower interior edges of the arcuate halves have an inwardly projecting lip to hold the foam liner in place.

BRIEF DESCRIPTION OF THE DRAWING

In the accompanying drawing which forms a part of the specification.

ILLUSTRATIVE SPECIFIC EMBODIMENT

Figure 1:
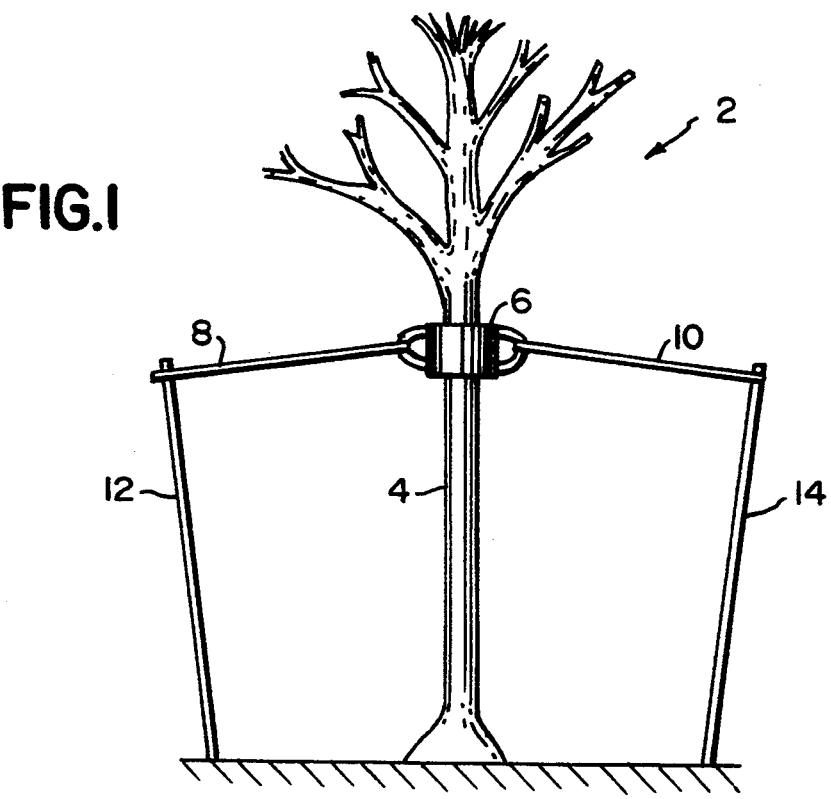
FIG. 1 is an overall view of the support collar of the 1 an present invention, around a young growing tree with support stakes adjacent to the collar spaced from the tree and connected to the collar by guide wires or rope secured to bilateral ears extending from the respective sides of the biforcated collar.

Shown in FIG. 1 of the accompany drawing a young growing tree 2 having the upright trunk 4 is supported by collar 6 of the present invention to which guide wires or ropes 8 and 10 respectively which are secured at one end to the collar 6 and at the opposite ends to stakes 12 and 14. At the collar they are secured to ear like handles 16 and 18 respectively on the exterior of opposed sides of the collar 6.

Figure 2:
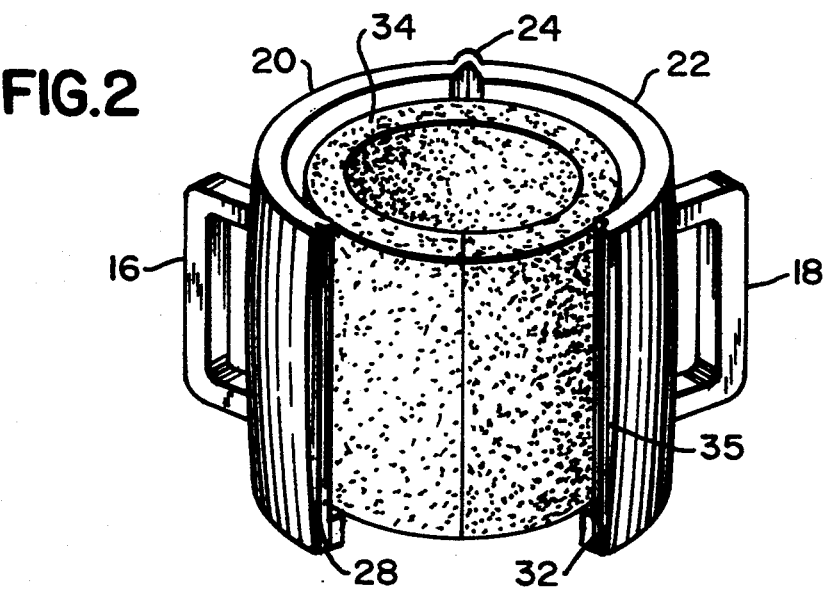
FIG. 2 is a perspective view of the collar itself from the front and top showing the collar opened up and the foam rubber insert within the collar.
Figure 3:
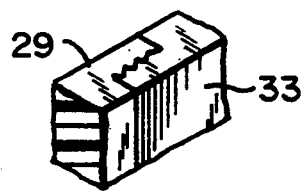
FIG. 3 is a view, partly cut away, showing the overlapping edges and catch and front closure of the collar.
Figure 4:
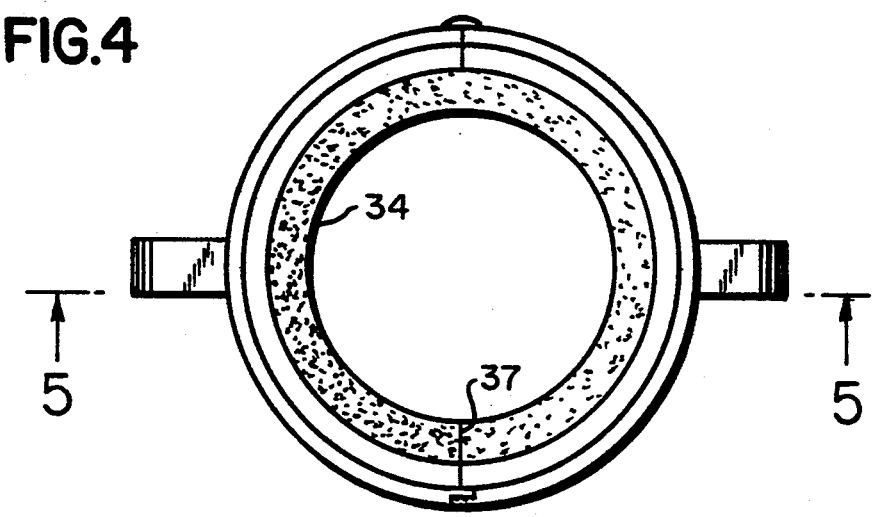
FIG. 4 is a top plan view of the collar.
Figure 5:
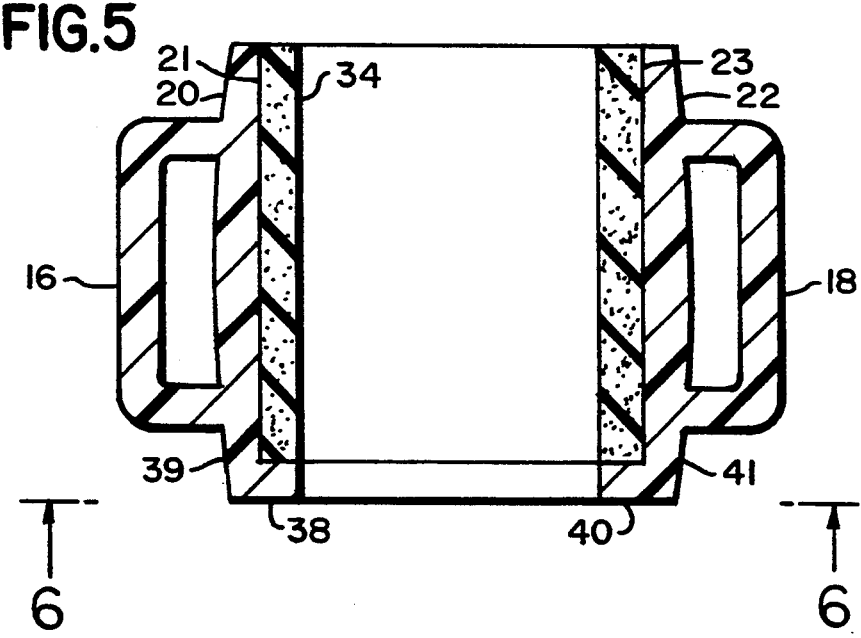
FIG. 5 is a sectional view taken along lines 5—5 FIG. 4.
Figure 6:
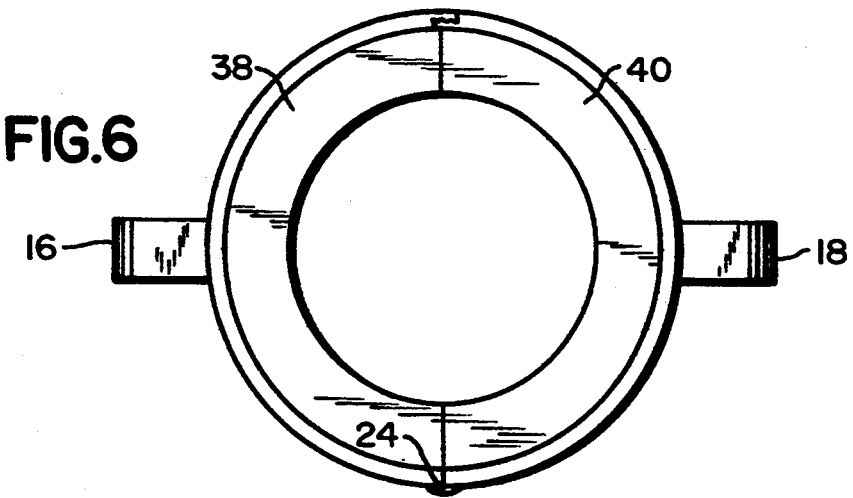
FIG. 6 is a bottom plan view of the collar taken from the view of line 6—6 of FIG. 5.

Shown best in FIGS. 2, 4, and 6, the collar 6 is comprised of arcuate halves 20 and 22 joined at the rear of the collar 6 by an integrally molded plastic hinge 24 running the full length of the device. The front edges 28 and 32 of the respective sides 20 and 22 have staggered faces 29 and 33 respectively which serve as a latch 35 means. A separate split foam rubber or plastic insert 34 approximately ½ inch in thickness and having the same vertical dimensions as the inner faces 21 and 23 of the walls 20 and 22 of the collar 6 with the outer diameter substantially the same as the inner diameter of the collar 6 is inserted. It is split longitudinally at 37 to allow it to open to place around the tree 2. The sponge rubber insert 34 is supported in place by the ledges 38 and 40 extending inwardly from the bases 39 and 41 of the respective halves 20 and 22 as shown more clearly in FIGS. 5 and 6. This device is preferably made of readily moldable thermal plastic such as polyethylene using well known techniques.

Different thicknesses of foam may be utilized depending upon the size of the tree and changed as the trunk thickens.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. A tree support collar comprising two plastic arcuate halves hinged together on opposed vertical sides by an integral plastic hinge, said halves having cooperating snap closure means for releasably locking them together on opposed vertical edges, lower ends of said arcuate halves having an inwardly projecting support means for holding a foam liner in place, said liner being generally cylindrical in shape with an outer diameter approximately the same as the inner diameter of said collar when said halves are in the closed position, said liner having at least one longitudinal opening to permit placement around a tree trunk, said liner resting on said support means when said collar is in the closed position, and guy rope fastening means on exterior surfaces of said halves.

* * * * *